United States Patent
Lubben et al.

(10) Patent No.: US 12,448,989 B2
(45) Date of Patent: Oct. 21, 2025

(54) AUXILIARY HYDRAULIC SYSTEM FOR A WORK VEHICLE

(71) Applicant: DEERE & COMPANY, Moline, IL (US)

(72) Inventors: Jeffrey L. Lubben, Hudson, IA (US); Craig A. Puetz, Waterloo, IA (US); Nathanael K. Rehn, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 913 days.

(21) Appl. No.: 17/651,884

(22) Filed: Feb. 21, 2022

(65) Prior Publication Data

US 2023/0265864 A1 Aug. 24, 2023

(51) Int. Cl.
*F15B 1/04* (2006.01)
*B60D 1/62* (2006.01)
*B60T 13/14* (2006.01)
*B62D 5/30* (2006.01)
*F15B 13/02* (2006.01)

(52) U.S. Cl.
CPC ............... *F15B 1/04* (2013.01); *B60D 1/62* (2013.01); *B60T 13/14* (2013.01); *B62D 5/30* (2013.01); *F15B 13/024* (2013.01); *B60T 2270/402* (2013.01); *F15B 2201/51* (2013.01)

(58) Field of Classification Search
CPC ........ F14B 1/04; B60T 13/662; B60T 13/686; B60T 13/14
See application file for complete search history.

(56) References Cited

U.S. PATENT DOCUMENTS

| | | |
|---|---|---|
| 3,820,620 A | 6/1974 | Miller et al. |
| 3,913,324 A | 10/1975 | Miller et al. |
| 3,995,711 A | 12/1976 | Kittle et al. |
| 4,190,298 A | 2/1980 | Klope |
| 4,303,089 A | 12/1981 | Gage et al. |
| 4,317,499 A | 3/1982 | Miller |
| 4,326,558 A | 4/1982 | Gage |
| 4,345,660 A | 8/1982 | Miller |
| 5,201,174 A | 4/1993 | Barber et al. |
| 6,935,445 B2 | 8/2005 | Johnson |
| 7,401,465 B2 | 7/2008 | Emmert et al. |
| 7,517,026 B1 | 4/2009 | Herbst et al. |
| 10,668,947 B2 | 6/2020 | Eagles |

(Continued)

FOREIGN PATENT DOCUMENTS

| | | |
|---|---|---|
| DE | 102012022018 A1 | 5/2014 |
| DE | 102013110239 A1 | 2/2015 |

OTHER PUBLICATIONS

Chapter 16: Accumulators | Power & Motion, retrieved from <URL:https://www.powermotiontech.com/technologies/other-technologies/article/21884186/chapter-16-accumulators> on Feb. 1, 2022, 11 pages.

(Continued)

*Primary Examiner* — Nathaniel E Wiehe
*Assistant Examiner* — Daniel S Collins (57) ABSTRACT

An auxiliary hydraulic system including an accumulator, a control valve, and a hydraulic connector. The accumulator connects to a primary hydraulic system including a hydraulic pump, a brake circuit, and a steering circuit. The control valve selectively allows or prevents flow from an accumulator to at least one of the brake circuit and the steering circuit. The hydraulic connector selectively connects an external source to the accumulator and the control valve.

7 Claims, 7 Drawing Sheets

(56) References Cited

U.S. PATENT DOCUMENTS

2008/0091319 A1    4/2008  Schick et al.
2009/0001805 A1    1/2009  Schick et al.
2015/0377260 A1*  12/2015  Besemer ................ F15B 11/08
                                                                60/430

OTHER PUBLICATIONS

German Search Report issued in application No. DE102022213501.6, dated Jul. 25, 2023, 10 pages.

* cited by examiner

AUXILIARY HYDRAULIC SYSTEM FOR A WORK VEHICLE

FIELD OF THE DISCLOSURE

The present disclosure relates to an auxiliary hydraulic system for a work vehicle.

BACKGROUND

Work vehicles include a hydraulic system having one or more hydraulic circuits operating one or more hydraulic components. Work vehicles can include a steering circuit and a braking circuit. The hydraulic system can include one or more hydraulic pumps. Work vehicles can include a backup hydraulic system.

The discussion above is merely general background information and is not intended to be used in determining the scope of the claimed subject matter.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an auxiliary hydraulic system for operating a steering circuit and a braking circuit.

According to an aspect of the present disclosure, an auxiliary hydraulic system includes an accumulator, a control valve, and first hydraulic connector. The accumulator is connected to a primary hydraulic system including a hydraulic pump, a brake circuit, and a steering circuit. The control valve selectively allows or prevents flow from the accumulator to at least one of the brake circuit and the steering circuit. The first hydraulic connector selectively connects an external source to the accumulator and the control valve.

According to an aspect of the present disclosure, a first pressure sensor detects a first pressure in the auxiliary hydraulic system. A second pressure sensor detects a second pressure in the accumulator.

According to an aspect of the present disclosure, a flow restrictor and a first check valve allow flow from the hydraulic pump to the accumulator by bypassing the control valve.

According to an aspect of the present disclosure, a pressure relief valve limits the pressure in the auxiliary hydraulic system and prevents the accumulator from an overcharge condition.

According to an aspect of the present disclosure, a second check valve prevents flow from the hydraulic pump back through the control valve.

According to an aspect of the present disclosure, a second hydraulic connector selectively connects an external sump to a pressure relief valve limiting the pressure in the auxiliary hydraulic system and preventing the accumulator from an overcharge condition.

According to an aspect of the present disclosure, an auxiliary hydraulic system connects a towing vehicle to a towed vehicle. A first hydraulic connector is connected to at least one of a brake circuit and a steering circuit of the towed vehicle. A second hydraulic connector is connected to a primary hydraulic system of the towing vehicle. A first hydraulic line is connected to the first hydraulic connector and the second hydraulic connector. The first hydraulic line allows flow in both directions between the towed vehicle and the towing vehicle. An accumulator is connected to the first hydraulic connector. A control valve is connected to the first hydraulic connector. A pressure relief valve is positioned between the accumulator and the primary hydraulic system.

According to an aspect of the present disclosure, the first hydraulic connector is a diagnostic connector.

According to an aspect of the present disclosure, the second hydraulic connector is a selective control valve connector.

According to an aspect of the present disclosure, the second hydraulic connector is a trailer brake connector.

According to an aspect of the present disclosure, a third hydraulic connector is connected to at least one of a brake circuit and steering circuit of the towed vehicle. A fourth hydraulic connector is connected to a primary hydraulic system of the towing vehicle. A second hydraulic line is connected to the third hydraulic connector and the fourth hydraulic connector. The first hydraulic line allows flow in the direction from the towing vehicle to the towed vehicle. The second hydraulic line allows flow in the direction from the towed vehicle to the towing vehicle.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The implementations disclosed in the above drawings and the following detailed description are not intended to be exhaustive or to limit the present disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of one or more functional components, logical components, and various processing steps, which may be comprised of one or more hardware, software, and firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described implementations.

Figure 1:
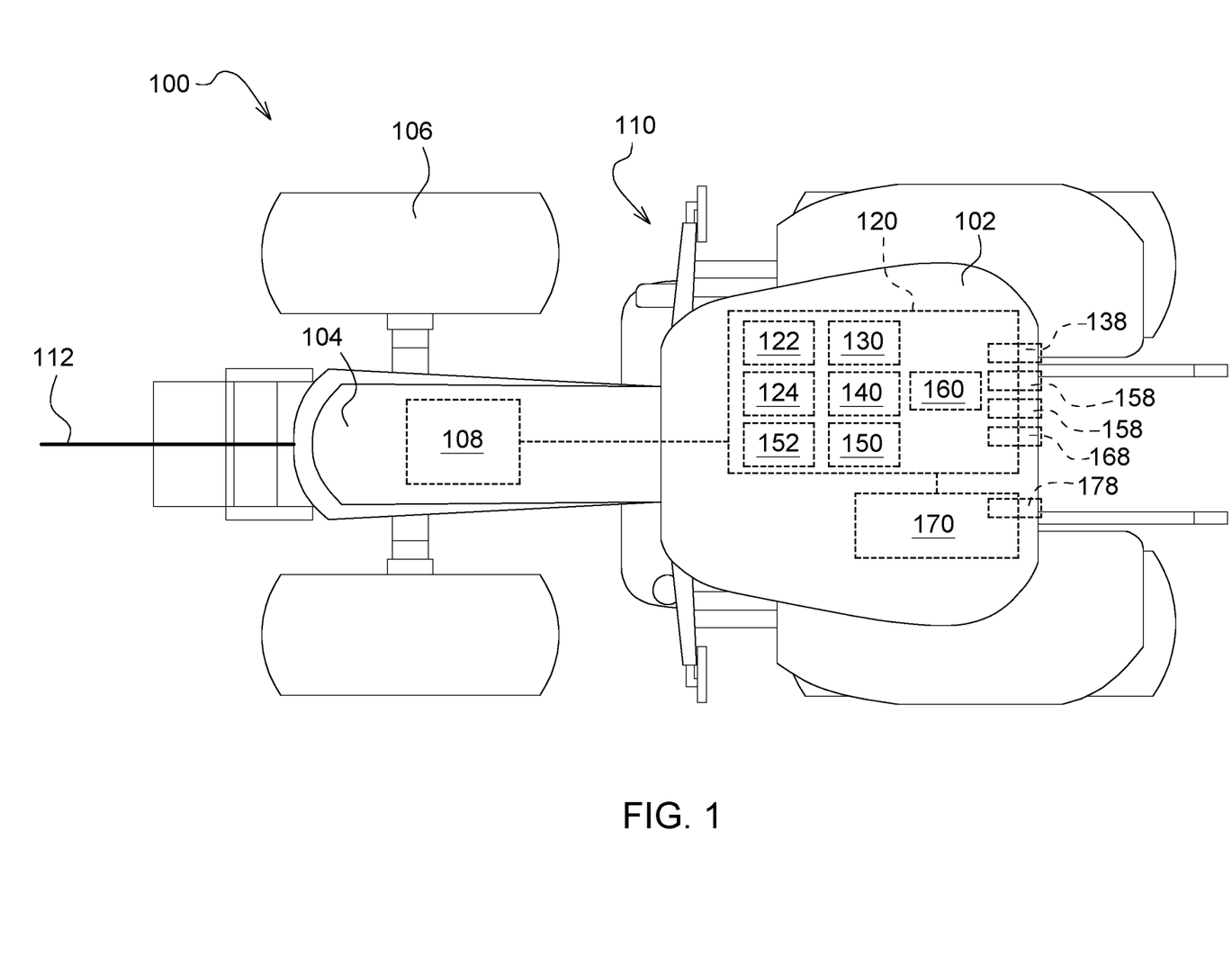
FIG. 1 is a schematic diagram of a work vehicle including an auxiliary hydraulic system, according to an implementation.

FIG. 1 illustrates a work vehicle 100, for example an agricultural tractor. This disclosure also applies to other types of work vehicles in agriculture, construction, forestry, and road building. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic machine. A chain or tow bar 112 can be selectively connected to either the front or the rear of the work vehicle 100 for pulling or towing. The work vehicle 100 can include a primary hydraulic system 120 and an auxiliary hydraulic system 170. The one or more power sources 108 can provide power to the one or more hydraulic pumps 122.

The primary hydraulic system 120 can include one or more hydraulic pumps 122 and any number of hydraulic circuits operating a variety of components 124. Each hydraulic circuit can include one or more hydraulic components. The primary hydraulic system 120 can include a brake circuit 130, a steering circuit 140, an implement circuit 150, a trailer brake circuit 160. The primary hydraulic system 120 can include one or more external hydraulic ports or connectors. The primary hydraulic system 120 can include one or more selective control valve (SCV) ports or connectors 158 connected to one or more selective control valves (SCV's) 152, a trailer brake port or connector 168 connected to the trailer brake circuit 160, a diagnostic port or connector 138 connected to at least one of the brake circuit 130 and the steering circuit 140, and an auxiliary port or connector 178 connected to the primary hydraulic system 120 or to one or more of the hydraulic circuits.

Figure 2:
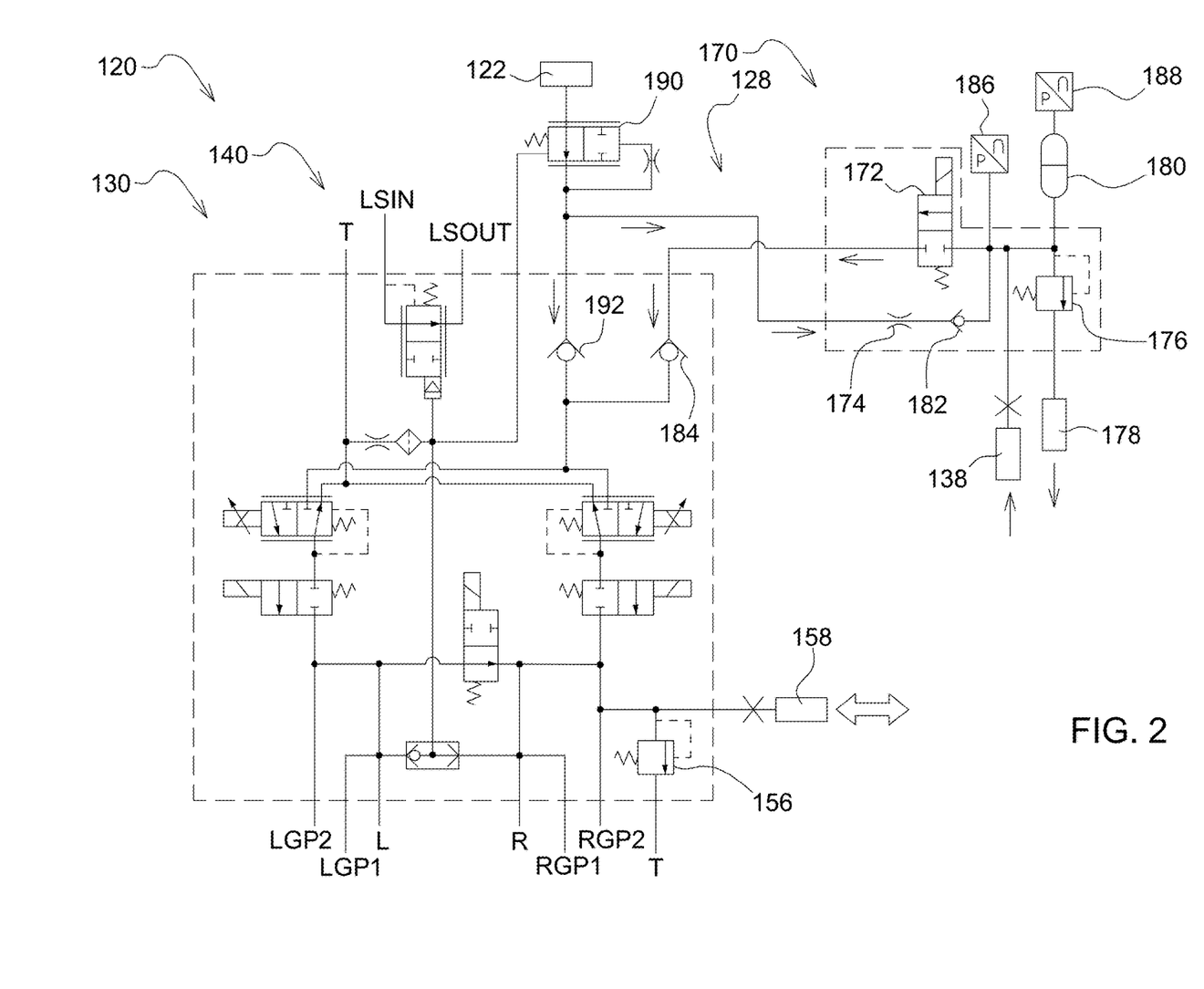
FIG. 2 is a schematic diagram of an auxiliary hydraulic system, according to an implementation.
Figure 3:
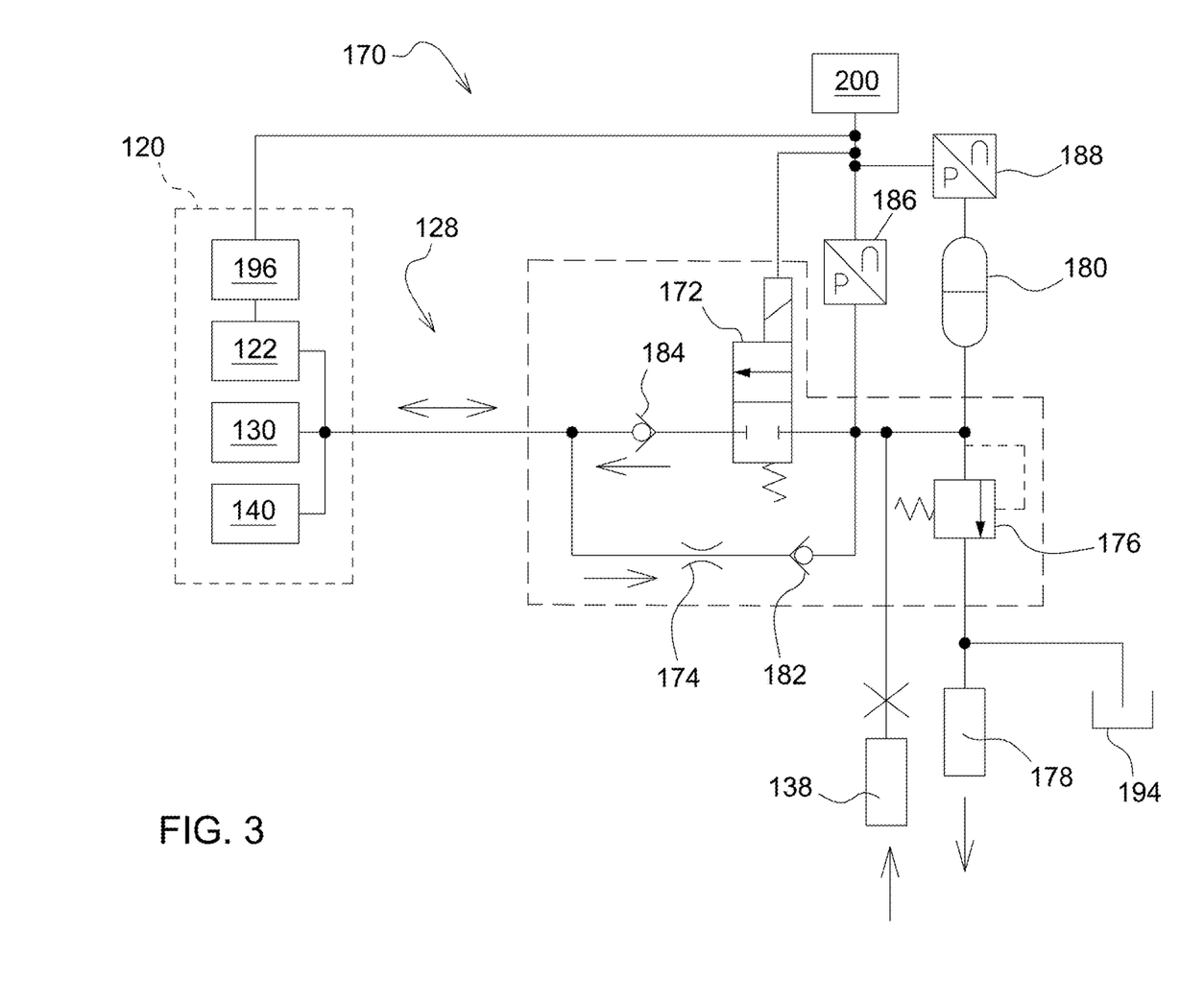
FIG. 3 is a schematic diagram of an auxiliary hydraulic system, according to an implementation.

With reference to FIGS. 2 and 3, the auxiliary hydraulic system 170 can connect to the diagnostic connector 138, the auxiliary connector 178, or both, or to any other type of port or connector. The auxiliary hydraulic system 170 can connect to one or more of the brake circuit 130, the steering circuit 140, and the hydraulic pump 122 via a feed line or circuit 128. The configuration or arrangement of the feed circuit 128 varies between FIGS. 2 and 3 as shown. The auxiliary hydraulic system 170 can include a control valve 172 selectively allowing or preventing flow from an accumulator 180 to the feed circuit 128. The control valve 172 can include a first position preventing flow to the feed circuit 128 and a second position allowing flow through a check valve 184 to the brake circuit 130, the steering circuit 140, or both.

The auxiliary hydraulic system 170 can include a fixed or variable flow control valve or flow restrictor 174 between the feed circuit 128 and the accumulator 180. The flow from the hydraulic pump 122 can flow through the flow restrictor 174 and a check valve 182 before reaching the accumulator 180. The flow from the hydraulic pump 122 to the accumulator 180 bypasses the control valve 172. A pressure sensor 196 measures or senses the pressure at an outlet of the hydraulic pump. The check valve 182 can prevent flow from the accumulator 180 and the diagnostic connector 138 to the feed circuit 128 through the flow restrictor 174. The check valve 184 can prevent flow from the feed circuit 128 back through the control valve 172.

The auxiliary hydraulic system 170 can include a pressure relief valve 176 to limit the pressure in the auxiliary hydraulic system 170. The pressure relief valve 176 can prevent an overcharge condition of the accumulator 180. The pressure relief valve 176 can limit or relieve any over pressure from the hydraulic pump 122 or an external source connected to the diagnostic connector 138. The pressure relief valve 176 can limit or relieve the pressure to a sump 194, the auxiliary connector 178, or both. The pressure relief valve 176 can relieve the over pressure to an external sump via the auxiliary connector 178. A pressure sensor 186 measures or senses the pressure in the auxiliary hydraulic system 170. A pressure sensor 188 measures or senses the pressure in the accumulator 180. A pressure relief valve 156 can be connected to an SCV connector 158. The pressure relief valve 156 can limit or relieve the pressure in any line connected to the SCV connector 158.

The auxiliary hydraulic system 170 can provide supplemental or additional flow to the primary hydraulic system 120 when the hydraulic pump 122 is not providing any flow or is providing an inadequate or insufficient flow. The auxiliary hydraulic system 170 can provide supplemental or additional flow from the accumulator 180 via the control valve 172 and the check valve 184. The auxiliary hydraulic system 170 can provide flow to one or more of the hydraulic circuits in the primary hydraulic system 120. In some implementations, the auxiliary hydraulic system 170 provides flow to the brake circuit 130, the steering circuit 140, or both. The hydraulic pump 122 can recharge or replenish the accumulator 180 via the flow restrictor 174 and the check valve 182 when the hydraulic pump 122 is providing an adequate or sufficient flow or when the flow is not needed or required by the primary hydraulic system 120. The hydraulic pump 122 can recharge the accumulator 180 when the pressure at the outlet of the hydraulic pump 122 is greater than the pressure in the auxiliary hydraulic system 170. Alternatively, or additionally, an external source can recharge or replenish the accumulator 180 via the diagnostic connector 138.

The pressure sensors 186, 188, 196 and the control valve 172 can connect to and communicate with an electronic control unit or controller 200. When the pressure sensor 196 senses the pressure at the outlet of the hydraulic pump 122 is below a threshold, the controller 200 can send one or more electronic signals to create a visual or audible indicator or alert. Alternatively, or additionally, the controller 200 can send one or more electronic signals to move the control valve 172 to the second position allowing flow from the auxiliary hydraulic system 170 to at least one of the brake circuit 130 and the steering circuit 140. When the pressure sensor 186 senses the pressure of the auxiliary hydraulic circuit 170 is below a threshold, or when the pressure sensor 188 senses the pressure of the accumulator is below a threshold, the controller 200 can provide a visual or audible indicator or alert.

The electronic control unit or controller 200 includes a processor and memory. The controller 200 can include digital and analog inputs and outputs. The controller 200 can include a non-transitory, computer readable memory or medium. The controller 200 connects to and communicates with various input and output devices.

Figure 4:
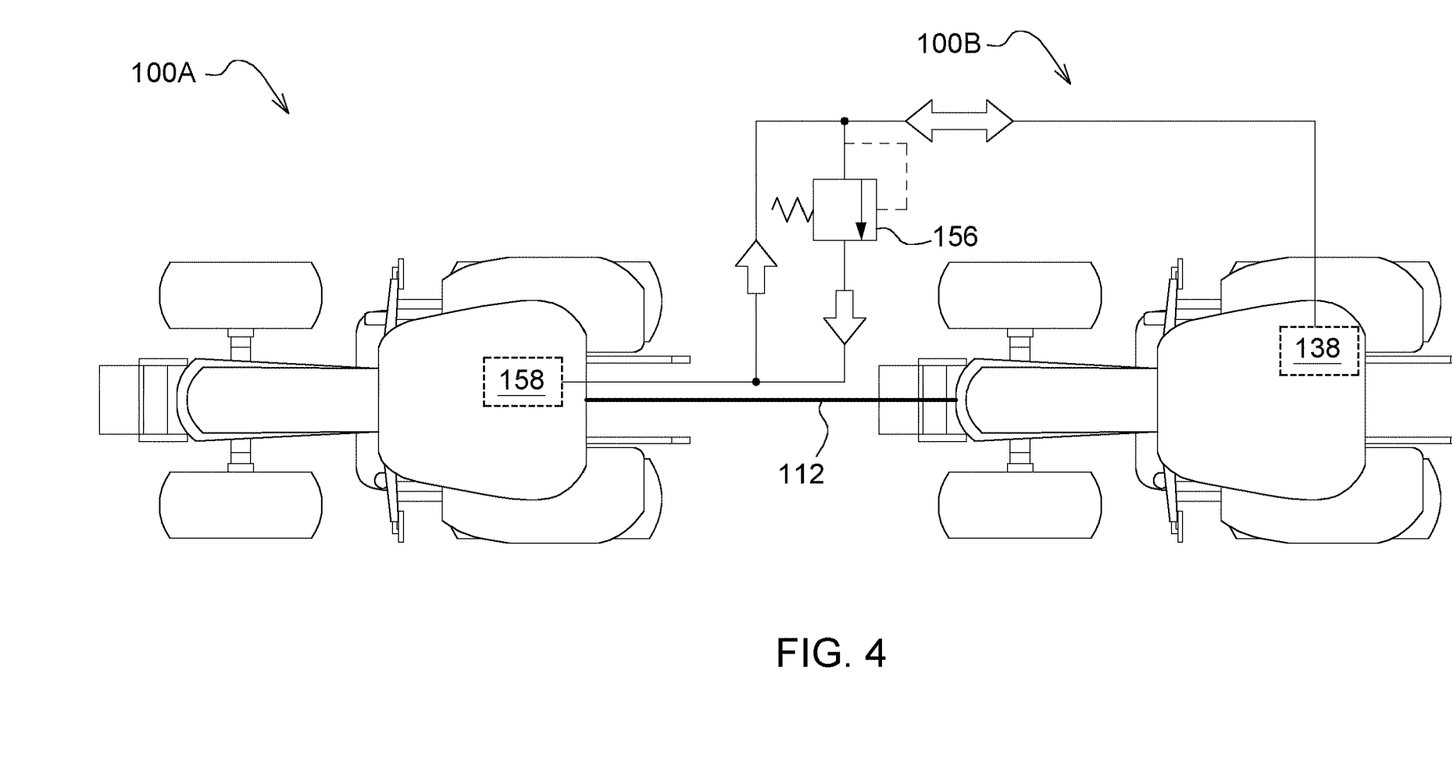
FIG. 4 is a schematic diagram of a towing vehicle and a towed vehicle, according to an implementation.
Figure 5:
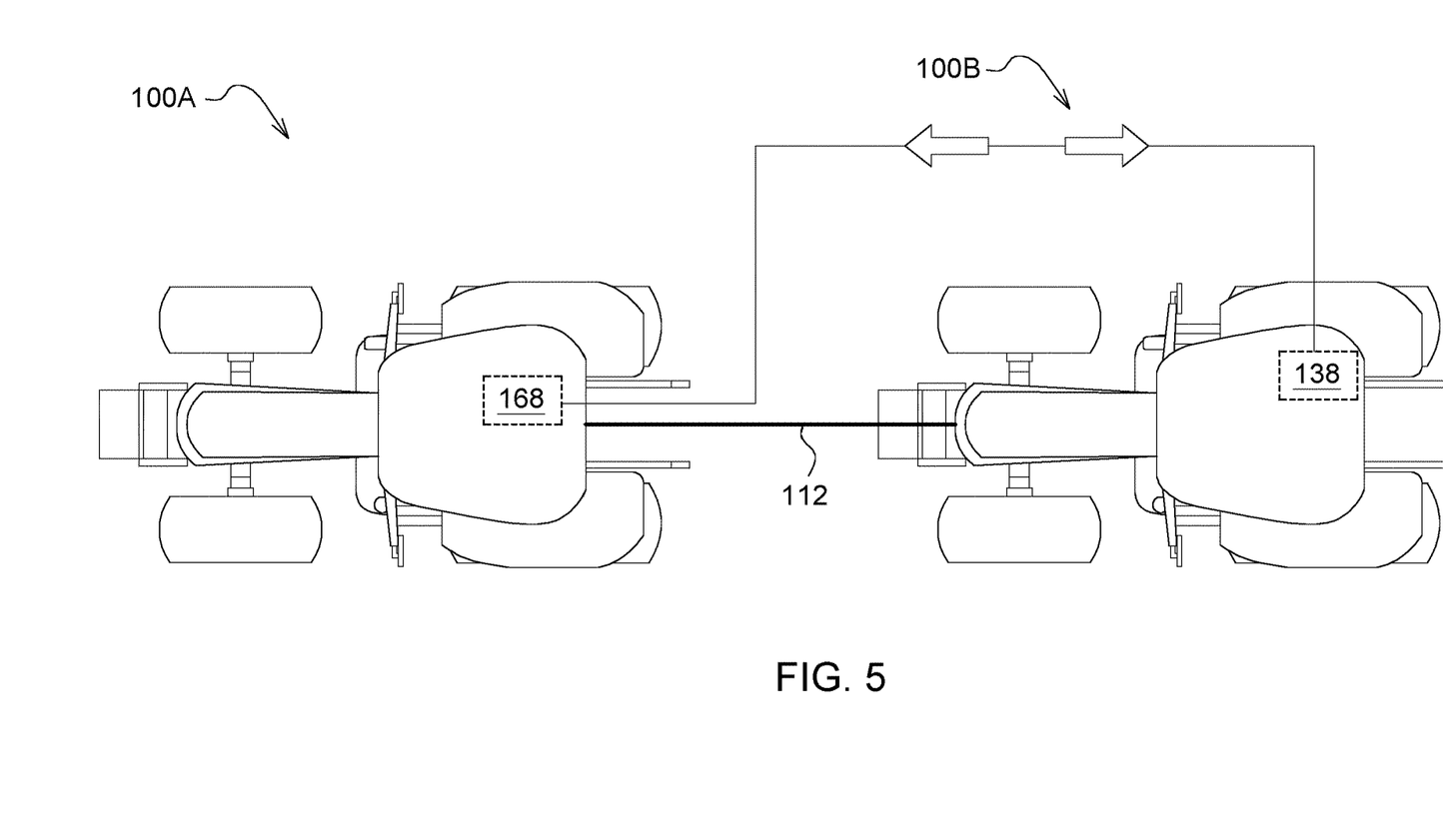
FIG. 5 is a schematic diagram of a towing vehicle and a towed vehicle, according to an implementation.
Figure 6:
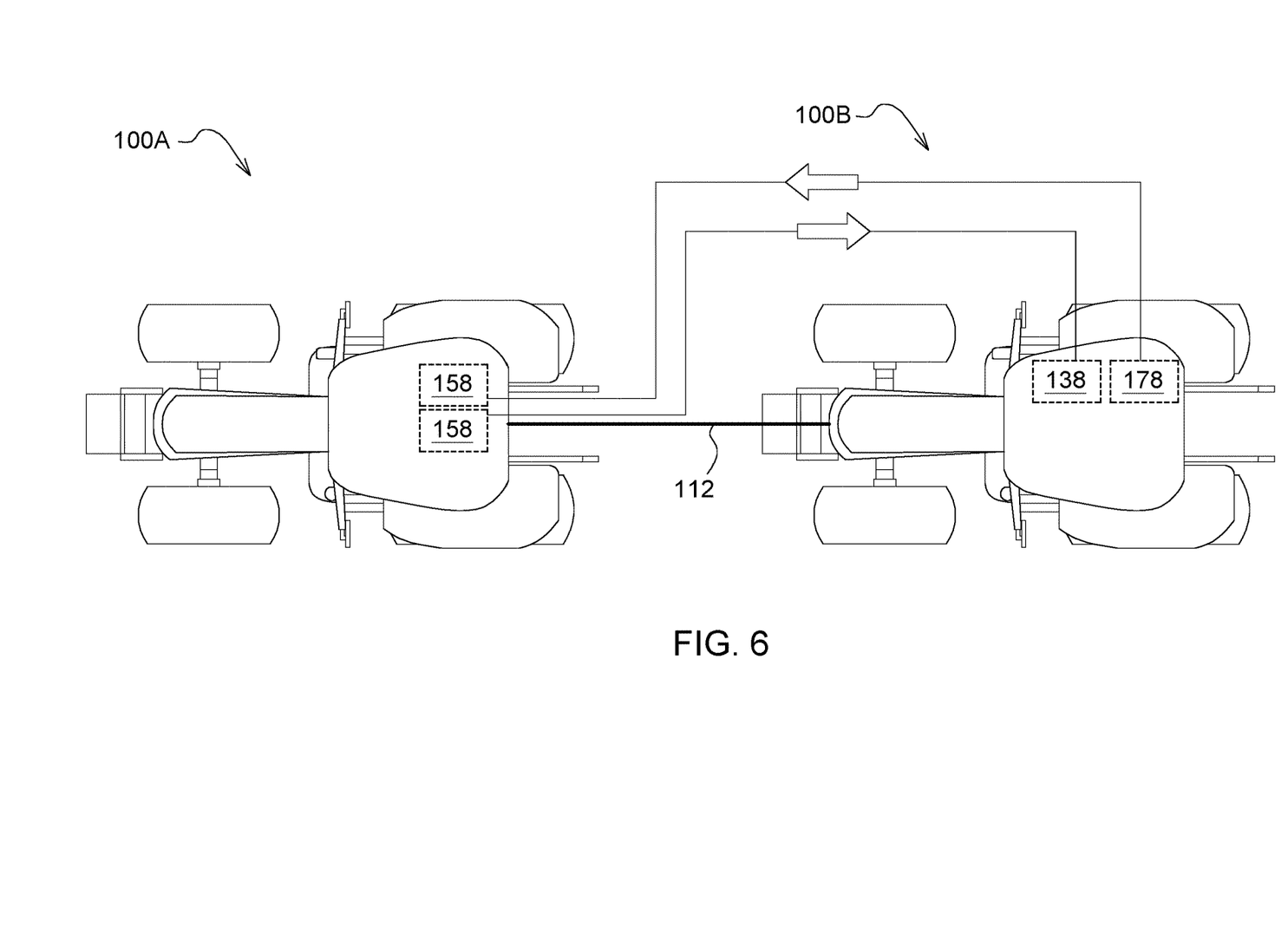
FIG. 6 is a schematic diagram of a towing vehicle and a towed vehicle, according to an implementation.

With reference to FIGS. 4-6, a towing vehicle 100A is connected to a towed vehicle 100B via a tow bar 112. The towed vehicle 100B could be in need of assistance. For example, the hydraulic pump 122 in the towed vehicle 100B could not be providing any flow or could be providing an insufficient flow for one or more of the hydraulic circuits in the primary hydraulic system 120. If flow is needed for the brake circuit 130, the steering circuit 140, or both, the auxiliary hydraulic system 170 can provide the needed flow.

With reference to FIG. 4, a hydraulic line or hose 154 can connect the SCV connector 158 of the towing vehicle 100A to the diagnostic connector 138 or the auxiliary connector 178 of the towed vehicle 100B. The primary hydraulic system 120 of the towing tractor 100A can include a pressure relief valve 156 to prevent over pressurization of the brake circuit 130, the steering circuit 140, or both in the towed vehicle 100B. Alternatively, or additionally, the primary hydraulic system 120 of the towed vehicle 100B can include a pressure relief valve 156 to prevent over pressurization of the brake circuit 130, the steering circuit 140, or both in the towed vehicle 100B. Hydraulic fluid can flow in both directions between the SCV connector 150 of the towing vehicle 100A and the diagnostic connector 138 of the towed vehicle 100B. The one or more selective control valves (SCV's) 152 of the towing vehicle 100A can operate the brake system 130, the steering system 140, or both, of the towed vehicle 100B.

With reference to FIG. 5, a hydraulic line or hose 154 can connect the trailer brake connector 168 of the towing vehicle 100A to the diagnostic connector 138 or the auxiliary connector 178 of the towed vehicle 100B. Hydraulic fluid can flow in both directions between the trailer brake connector 168 of the towing vehicle 100A and the diagnostic connector 138 of the towed vehicle 100B. The towing vehicle 100A can operate one or more of the brake circuit 130 and the steering circuit 140 of the towed vehicle 100B via the trailer brake circuit 160 of the towing vehicle 100A. The towing vehicle 100A can operate the towing vehicle 100B as a trailer.

With reference to FIG. 6, a first hydraulic line or hose 154A can connect a first SCV connector 158 of the towing vehicle 100A to the diagnostic connector 138, or any connector, of the towed vehicle 100B. A second hydraulic line or hose 154B can connect a second SCV connector 158 of the towing vehicle 100A to the auxiliary connector 178, or any other connector, of the towed vehicle 100B. Hydraulic fluid can flow in one direction from the first SCV connector 158 of the towing vehicle 100A to the diagnostic connector 138 of the towed vehicle 100B. Hydraulic fluid can flow in the other direction from the auxiliary connector 178 of the towed vehicle 100B to the second SCV connector 158 of the towing vehicle 100A. The implement circuit 150 of the towing vehicle 100A can operate ate least one of the brake system 130 and the steering system 140 of the towed vehicle 100B.

Figure 7:
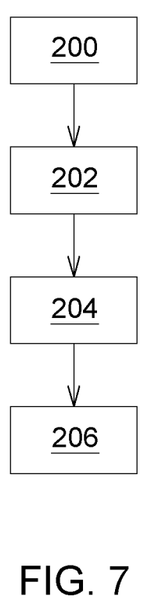
FIG. 7 is a flow diagram for operating an auxiliary hydraulic system, according to an implementation.

With reference to FIG. 7, a method for operating an auxiliary hydraulic system 170 of a work vehicle 100 can include one or more of the following steps, processes, or operations. At step 200, the method can include identifying or detecting when a hydraulic pump 122 is not providing any flow or is not providing sufficient flow to a primary hydraulic system 120. At step 202, the auxiliary hydraulic system 170 can provide flow to the primary hydraulic system 120 from the accumulator 180 by at least partially opening the control valve 172. At step 204, the method can include identifying or detecting when the auxiliary hydraulic system 170 is not providing sufficient flow to a primary hydraulic system 120.

At step 206, an external source is connected to the auxiliary hydraulic system 170 to provide the needed flow. The external source can include any portable or stationary source, for example another work vehicle 100, providing supplemental or additional flow to the auxiliary hydraulic system 170. The external source can provide supplemental flow for at least one of the brake circuit 130, the steering circuit, and to recharge the accumulator 180. In other implementations, one or more of these steps, processes, or operations may be omitted, repeated, re-ordered, combined, or separated and still achieve the desired results.

Without in any way limiting the scope, interpretation, or application of the claims appearing below, a technical effect of one or more of the example implementations disclosed herein is an auxiliary hydraulic system providing additional flow to a primary hydraulic system of a work vehicle. Another technical effect of one or more of the example implementations disclosed herein is an auxiliary hydraulic system for a work vehicle which includes an accumulator to selectively supplement the flow of the primary hydraulic system. Another technical effect of one or more of the example implementations disclosed herein is an auxiliary hydraulic system for a work vehicle which connects to an external source to selectively supplement the flow of the primary hydraulic system. Another technical effect of one or more of the example implementations disclosed herein is an auxiliary hydraulic system which provides additional flow for the brake and steering hydraulic circuits of a work vehicle.

The terminology used herein is for describing particular implementations and is not intended to be limiting of the present disclosure. As used herein, the singular forms "a," "an," and "the" are intended to include the plural forms as well, unless the context clearly indicates otherwise. It will be further understood that any use of the terms "has," "includes," "comprises," or the like, in this specification, identifies the presence of one or more stated features, integers, steps, operations, elements, and components, but does not preclude the presence or addition of one or more other features, integers, steps, operations, elements, components, and groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. An auxiliary hydraulic system, comprising:
    an accumulator connected to a primary hydraulic system including a hydraulic pump, a brake circuit, and a steering circuit;
    a control valve selectively allowing or preventing flow from the accumulator to the brake circuit and the steering circuit;
    a first selective control valve (SCV) port selectively connecting an external source to the accumulator and the control valve;
    a second selective control valve (SCV) port selectively connecting the external source to the accumulator and the control valve;
    a pressure relief valve positioned between the accumulator and the second selective control valve (SCV) port, the pressure relief valve relieving the pressure to the second selective control valve (SCV) port, and the pressure relief valve limiting the pressure in the auxiliary hydraulic system and preventing the accumulator from an overcharge condition;
    a first pressure sensor detecting a first pressure in the auxiliary hydraulic system;
    a second pressure sensor detecting a second pressure in the accumulator;
    a flow restrictor positioned between the hydraulic pump and the accumulator;
    a first check valve allowing flow from the hydraulic pump through the flow restrictor to the accumulator by bypassing the control valve, the first check valve preventing flow from the accumulator to the flow restrictor; and
    a second check valve allowing flow from the accumulator to the primary hydraulic system and preventing flow from the hydraulic pump to the control valve.

2. The auxiliary hydraulic system of claim 1, further comprising:
    a controller connected to the first and second pressure sensors, the controller configured to send an electronic signal to create an alert when at least one of the first pressure and the second pressure is below a threshold.

3. The auxiliary hydraulic system of claim 1, further comprising:
    a third pressure sensor detecting a third pressure at an outlet of the hydraulic pump; and
    a controller connected to the third pressure sensor, the controller configured to open the control valve and allow flow from the accumulator to the brake and steering circuits when the third pressure is below a threshold.

4. An auxiliary hydraulic system connecting a towing vehicle to a towed vehicle, comprising:
    a first selective control valve (SCV) port in the towed vehicle connected to a brake circuit and a steering circuit of the towed vehicle;
    a second selective control valve (SCV) port in the towing vehicle connected to a primary hydraulic system of the towing vehicle, the primary hydraulic system including a hydraulic pump in the towing vehicle;
    a first hydraulic line connected between the first selective control valve (SCV) port and the second selective control valve (SCV) port, the first hydraulic line allowing flow in both directions between the towed vehicle and the towing vehicle;
    an accumulator in the towed vehicle connected to the first selective control valve (SCV) port;
    a control valve in the towed vehicle connected to the first selective control valve (SCV) port; and
    a pressure relief valve in the towed vehicle positioned between the accumulator and the first selective control valve (SCV) port, the pressure relief valve limiting the pressure in the auxiliary hydraulic system and preventing the accumulator from an overcharge condition;
    a first pressure sensor in the towed vehicle detecting a first pressure in the auxiliary hydraulic system;
    a second pressure sensor in the towed vehicle detecting a second pressure in the accumulator;
    a flow restrictor in the towed vehicle positioned between the hydraulic pump and the accumulator;
    a first check valve in the towed vehicle allowing flow from the hydraulic pump through the flow restrictor to the accumulator by bypassing the control valve, the first check valve preventing flow from the accumulator through the flow restrictor; and
    a second check valve in the towed vehicle allowing flow from the accumulator to the primary hydraulic system and preventing flow from the hydraulic pump through the control valve.

5. The auxiliary hydraulic system of claim 4, further comprising:
    a third selective control valve (SCV) port connected to at least one of a brake circuit and steering circuit of the towed vehicle;
    a fourth selective control valve (SCV) port connected to a primary hydraulic system of the towing vehicle; and
    a second hydraulic line connected between the third hydraulic connector and the fourth hydraulic connector;
    the first hydraulic line allowing flow in the direction from the towing vehicle to the towed vehicle; and
    the second hydraulic line allowing flow in the direction from the towed vehicle to the towing vehicle.

6. The auxiliary hydraulic system of claim 4, further comprising:
    a controller in the towed vehicle connected to the first and second pressure sensors, the controller configured to send an electronic signal to create an alert when at least one of the first pressure and the second pressure is below a threshold.

7. The auxiliary hydraulic system of claim 4, further comprising:
    a third pressure sensor in the towed vehicle detecting a third pressure at an outlet of a hydraulic pump in the towed vehicle; and
    a controller in the towed vehicle connected to the third pressure sensor, the controller configured to open the control valve and allow flow from the accumulator to the brake and steering circuits when the third pressure is below a threshold.

* * * * *